United States Patent Office 3,732,188
Patented May 8, 1973

3,732,188
PROCESS FOR MAKING POLYIMIDE PRE-
POLYMER AND PRODUCT PRODUCED
THEREBY
Fred F. Holub and John T. Hoback, Schenectady, N.Y.,
assignors to General Electric Company
No Drawing. Continuation-in-part of application Ser. No.
26,079, Apr. 6, 1970, now Patent No. 3,678,015. This
application Mar. 18, 1971, Ser. No. 125,875
The portion of the term of the patent subsequent to
July 18, 1989, has been disclaimed
Int. Cl. C08g 20/00
U.S. Cl. 260—78 UA                                    23 Claims

ABSTRACT OF THE DISCLOSURE

A method is provided for making a curable prepolymeric reaction product of an organic diamine and an aliphatically unsaturated dicarbonyl compound, such as an organic anhydride or organic dicarboxylic acid. The curable prepolymeric reaction product can be heat softened to allow incorporation of filler and is convertible to the infusible state by heat or by the employment of a free radical initiator. Reaction of the organic diamine and the aliphatically unsaturated dicarbonyl compound is effected in a phenolic solvent medium. A hydrocarbon solvent optionally can serve to facilitate removal of water of reaction prior to the recovery of the reaction product of the organic diamine and the aliphatically unsaturated dicarbonyl compound. The prepolymeric reaction product can be molded to produce high temperature resistant polyimide films and structures.

---

This application is a continuation in part of copending application Ser. No. 26,079, filed Apr. 6, 1970, now Pat. No. 3,678,015 and assigned to the same assignee as the present invention.

The present invention relates to a method for effecting reaction between an organic diamine and an aliphatically unsaturated dicarbonyl compound, such as an organic anhydride, in a phenolic solvent medium and to products produced thereby.

Prior to the present invention, mixtures of aliphatically unsaturated organic anhydrides, such as maleic anhydride and organic diamines were generally employed to make aliphatically unsaturated bisimides. Grundschober et al. Pat. 3,380,964 shows that m-phenylene-bis-maleimide, can be converted to the infusible state at temperatures up to 400° C. Although the conversion of such bisimides to the infusible state can provide cured products having valuable insulating and dielectric properties, the cured products are generally brittle. In addition, these bisimides have sharp melting points causing them to flow suddenly limiting their usefulness in commercial molding applications.

The present invention is based on a discovery that mixture of organic diamine and aliphatically unsaturated dicarbonyl compound, such as an organic anhydride, or organic dicarboxylic acid, can be converted to a polyimide prepolymer having improved processability in molding applications. The method involves forming a solution of organic diamine and aliphatically unsaturated dicarbonyl compounds in a phenolic solvent medium. The mixture can be heated to facilitate the separation of water of reaction. A hydrocarbon solvent can be utilized to further aid the removal of water from the reaction mixture.

There is provided by the present invention a method which comprises:

(1) Effecting reaction in the presence of a phenolic solvent between (A) organic diamine, and (B) aliphatically unsaturated dicarbonyl reactant, (2) Recovering a curable material from (1) comprising the reaction product of (A) and (B), where (B) is a member selected from the class consisting of:

(a) a butenedioic acid anhydride selected from the class consisting of, maleic anhydride, citraconic anhydride, or itaconic anhydride, (b) a dicarboxylic acid selected from the class consisting of, fumaric acid, maleic acid, or 5-vinyl-isophthalic acid, (c) mixtures of (a) and (b), and (d) a mixture of from 0.05 to 1 mole of a phthalic acid anhydride selected from the class consisting of tetrahydrophthalic anhydride, 3,6-endomethylene-1,2,3,6-tetrahydro-cris-phthalic anhydride, and mono methyl substituted 3,6-endomethylene-1,2,3,6-tetrahydro - cisphthalic anhydride, per mole of (a), (b), or (c).

Some of the organic diamines which can be employed in the practice of the invention are compounds included by the formula, (1)          $NH_2RNH_2$ where R is a diorgano radical, for example, a heterocyclic radical, an alkylene radical, an arylene radical having from 6 to 15 carbon atoms and YGY, where Y is arylene, such as phenylene, toluene, anthrylene, arylenealkylene, such as phenyleneethylene, etc., G is a divalent organo radical selected from alkylene radicals having from 1 to 10 carbon atoms, —O—, —S—, $SO_2$,

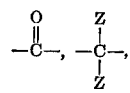

where Z is selected from methyl and trihalomethyl such trifluoromethyl, trichloromethyl, etc.

Organic diamines included by Formula 1 are, for example,
m-phenylenediamine;
p-phenylenediamine;
4,4'-diaminodiphenylpropane;
4,4'-diaminodiphenylmethane;
benzidine;
4,4'-diaminodiphenylsulfide;
4,4'-diaminodiphenylsulfone;
3,3'-diaminodiphenylsulfone;
4,4'-diaminodiphenyl ether;
2,6-diaminopyridine;
bis(4-aminophenyl)phosphineoxide;
bis(4-aminephenyl)-N-methylamine;
1,5-diaminonaphthalene;
3,3'-dimethyl-4,4'-diaminobiphenyl;
3,3'-dimethoxybenzidene;
2,4-bis(β-amino-t-butyl)toluene;
bis(p-β-amino-t-butylphenyl)ether;
p-bis(2-methyl-4-aminopentyl)benzene;
p-bis(1,1-dimethyl-5-aminopentyl)benzene;
m-xylylenediamine;
p-xylylenediamine;
bis(p-aminocyclohexyl)methane;
ethylenediamine;
propylenediamine;
hexamethylenediamine;
heptamethylenediamine;
octamethylenediamine;
nonamethylenediamine;
decamethylenediamine;
3-methylheptamethylenediamine;

4,4-dimethylheptamethylenediamine;
2,11-diaminododecane;
1,2-bis(3-aminopropoxy)ethane;
2,2-dimethylpropylenediamine;
3-methoxyhexamethylenediamine;
2,5-dimethylhexamethylenediamine;
5-methylnonamethylenediamine;
1,4-diaminocyclohexane;
1,12-diaminooctadecane;
2,5-diamino-1,3,4-oxadiazole;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;

and mixtures thereof. Organic amine mixtures consisting essentially of the organic diamines of Formula 1, and organic monoamines such as arylamines, for example aniline, aminobiphenyl, etc.; aliphatic amines such as allylamines, etc., also can be employed as the organic diamine in the practice of the invention.

Included by the aliphatically unsaturated carbonyl compounds which can be used in the practice of the invention are organic anhydrides derived from butanedioic acid, such as maleic anhydride, citraconic anhydride, and itaconic anhydride. Mixtures of such aliphatically unsaturated anhydrides and aliphatically unsaturated organic anhydrides derived from phthalic acid, such as tetrahydrophthalic, endomethylenetetrahydrophthalic, the mono methyl derivative thereof, referred to respectively as "Nadic and the methyl derivates thereof," chloro derivatives of such anhydrides, etc. also can be employed, where such mixtures can contain from about 0.05 to 1 mole of the phthalic acid anhydride derivatives, per mole of the butanedioic acid derivatives.

In addition to the above organic anhydrides, the aliphatically unsaturated carbonyl compounds also include aliphatically unsaturated dicarboxylic acids, such as fumaric, maleic, 5-vinyl isophthalic, etc. Further, mixtures of such aliphatically unsaturated dicarboxylic acids containing from about 0.05 to 1 mole of the aforementioned phthalic acid anhydride derivatives, per mole of the aliphatically unsaturated butanedioic acid derivatives also can be employed.

Mixtures of such aliphatically unsaturated carbonyl compound containing up to 10 mole percent of organic dianhydrides, for example, pyromellitic dianhydride, 3,3',4,4'-benzophenone dianhydric, based on the total moles of components in the anhydride mixture also can be employed.

In making the organic diamine-aliphatically unsaturated carbonyl compound reaction product, or "prepolymer," in accordance with the practice of the invention, the organic diamines as defined above, and the aliphatically unsaturated carbonyl compound, which hereinafter can signify the aliphatically unsaturated anhydride, aliphatically unsaturated dicarboxylic acid or mixtures thereof, as previously described, are mixed together in phenolic solvent medium. The term "phenolic solvent" as employed in the description of the invention, can signify, phenol, o-p-m cresol, mixtures of such cresols, known as cresylic acid, and mixtures of cresylic acid, with phenol.

In forming the reaction mixture, the order of addition of the various ingredients is not critical. There can be employed from about 0.5 to 2 moles, and preferably from 0.6 to 1.2 moles of organic diamine, per mole of aliphatically unsaturated carbonyl compound. Preferably, solids can be employed at from about 20 to 50 percent by weight of the total mixture, although the proportions of solids and solvent can vary widely. Effective results can be achieved with as little as 10 percent by weight of phenolic solvent. In instances where hydrocarbon solvent is employed the amount of hydrocarbon solvent used should be at least sufficient to effect the separation of water of reaction of the organic diamine and the aliphatically unsaturated dicarbonyl compound. Hydrocarbon solvents which can be employed, preferably have a boiling point in the range of from 110° C. to 170° C., and include, for example, xylyene, toluene, commercial hydrocarbon fractions, etc.

Depending upon such factors as reactant properties, temperature, type of reactants used, the prepolymer can be in the form of a polyamide acid, or it can be recovered after water of reaction has been separated. As described above, the separation of water can be facilitated by the employment of a hydrocarbon solvent.

Reaction betwen the organic diamine and the aliphatically unsaturated dicarbonyl compound can be effected at temperatures in the range of between 25° C. to 220° C., and preferably between 120° C. to 195° C. Depending upon such factors as reactant proportions, degree of agitation, temperature, etc., the formation of the prepolymer can be achieved in 2 hours or less.

Recovery of the prepolymer can be effected by allowing the reaction mixture to cool to room temperature and pouring the reaction mixture into a precipitating medium such as excess water, a monohydric aliphatic alcohol such as methanol, or other material employed in accordance with standard techniques. Filtration of the resulting mixture, followed by drying of the product will provide the prepolymer suitable for blending with other materials, such as filler, etc. If desired, the reaction solution can be employed directly without effecting the precipitation of the prepolymer to cast prepolymer film or to treat substrates by effecting the separation of the prepolymer through solvent evaporation.

The prepolymers of the present invention can be blended with various aliphatically unsaturated organic materials, such as aliphatically unsaturated organic monomers, and certain aliphatically unsaturated organic polymers as well as organic polymers free of aliphatic unsaturation. Blends of the prepolymers and the aforementioned organic monomers or polymers can be made over wide proportions by weight. Experience has shown that there should be employed at least about 25 percent by weight of prepolymer in the blend to provide for cured products having improved characteristics.

Among the various uses to which the aliphatically unsaturated imide prepolymers of the present invention can be employed are, for example to make laminating compounds, solvent resistant varnishes, molding compounds, coating compositions, etc., depending upon the proportions of the prepolymers and the organic polymer or monomer utilized in the blend.

Some of the aliphatically unsaturated monomers which can be blended with the prepolymers of the present invention are, for example styrene, bismaleimide, N-phenylmaleimide, divinylbenzene, triallylcyanurate, triallyltrimellitate. Among the organic polymers which can be employed in combination with the prepolymers of the present invention are, for example, polyvinylchloride, polyethylene, polypropylene, polysulfones, polystyrenes, polyurethane, organopolysiloxanes, polyesters, etc., and blends thereof Cure of the aliphatically unsaturated imide prepolymer of the present invention or blend thereof within the aforementioned organic monomers or polymers or combination thereof can be effected thermally or by the use of conventional free radical initiators. Temperatures of from 50° C. to 300° C. can be employed while 100° C. to 200° C. have sometimes been found to be more desirable. Acceleration of the cure of the aliphatically unsaturated prepolymer or blend thereof can be achieved with organic peroxides such as dicumyl peroxide, benzoyl peroxide, tertiary butylperbenzoate, tertiary alkylperoxy carbonate, azodicarboamide, 2,5-dimethyl-2,5-bis-(tertiarybutylperoxyhexane), etc. The peroxides can be employed from about 0.01 percent to about 5 percent by weight based on the total weight of the blend. In addition, the aliphatically unsaturated imide free polymer or blend thereof can be cured with heat or irradiation with high energy electrons, X-rays, ultraviolet light, etc., in addition to the aforementioned free radical initiators.

In addition to the aforementioned aliphatically unsaturated monomers, and organic polymers, the aliphatically unsaturated imide prepolymers of the present invention can be blended with from 0 to 200 parts of filler per 100 parts of the prepolymer. Included by the fillers which can be employed are, for example, clay, ground quartz, silica, sand, carbon black, glass fibers, glass beads, carbon fiber, asbestos, etc. In addition, other ingredients such as solvents are from 60 percent to 90 percent by weight of the resulting curable compositions also can be employed such as N-methylpyrrolidone, dimethylacetamide, toluene, ethylenechloride, as well as plasticizers such as dialkylphthalate, etc.

In order that those skilled in the art will be better able to practice the invention, the following examples are given by way of illustration and not by way of limitation.

EXAMPLE 1

A mixture of 98.06 parts of maleic anhydride, 99.13 parts of p,p'-methylenedianiline, 789.8 parts of distilled cresol and about 100 parts of xylene was stirred and heated to a temperature of 100° C. to produce a homogeneous solution. The mixture was then heated to a temperature of about 150° C. and a xylene-water azeotrope started to separate. Heating of the mixture was continued to a temperature of about 170° C. to effect the separation of about 93.3 percent of theoretical water of reaction of the maleic anhydride and the p,p'-methylenedianiline. The mixture was then allowed to cool to room temperature. It was poured slowly into excess methanol to affect the precipitation of product. The product was dried at 50° C. under reduced pressure for a period of about 5 hours. There was obtained a quantitative yield of a cream colored product. Based on method of preparation, the product was a low molecular weight polyimide having about 3 or 4 chemically combined imide units resulting from the reaction of maleic anhydride and p,p'-methylenedianiline.

The above prepolymer is molded at a temperature of 325° C. to produce a flexibile film having a tensile strength of about 5000 p.s.i.

EXAMPLE 2

In accordance with the procedure of Example 1, a mixture of maleic anhydride, p,p'-methylenedianiline, cresol, and xylene was made utilizing an equal molar amount of maleic anhydride and p,p'-methylenedianiline. The mixture was stirred and heated until a clear solution was obtained at 135° C. At 192° C., a xylene-water azeotrope began to distill over. After an hour of heating at a temperature to 213° C. 95.6 percent of the theoretical water was separated. The solution was then allowed to cool to room temperature. Based on method of preparation, there was obtained an olefinically unsaturated polyimide preprepolymer. A film was cast from the solution on a glass substrate. The film was cured by heating it at 150° C. for 1 hour and 200° C. for 1 hour. The film was found to have valuable dielectric and insulating characteristics.

A portion of the above solution was slowly added to excess methanol resulting in the precipitation of a yellow-colored solid. The solid was dried at 100° C./8 mm. for 5 hours. A portion of the yellow solid was molded at a temperature of 300° C. for 30 minutes at a pressure of 5000 p.s.i. There was obtained a test bar having superior shear modulus. The prepolymer is suitable for making bearings and automotive parts requiring high temperature stability.

The above procedure was repeated except that a solution was made utilizing 2 moles of p,p'-methylenedianiline, per mole of maleic anhydride. The mixture of maleic anhydride, p,p'-methylenedianiline, cresol and xylene was stirred and heated until a solution was formed at 140° C. Heating was continued until a xylene-water azeotrope began to distill from the solution at 170° C. The mixture was heated for an additional hour at a temperature to 210° C. resulting in the separation of 95.6 percent of the theoretical water of reaction. The mixture was poured into methanol to effect the precipitation of a quantitative yield of a cream colored solid. The solid began to soften at 132° C. and was sufficiently fluid at 166° C. to allow incorporation of a reinforcing filler. Based on method of preparation, the solid was an amine terminated polyimide prepolymer of about 3 or 4 chemically combined units of the reaction product of a p,p'-methylenedianiline and maleic anhydride.

A blend of 30 parts of the above prepolymer and 70 parts of glass fiber is made in a Waring Blendor. There is added 0.1 percent by weight of dicumyl peroxide. The resulting blend is molded at 165° C. under a pressure of 5000 p.s.i. to a test bar exhibiting superior shear modulus.

EXAMPLE 3

A mixture of 251.2 parts of distilled cresol, about 25 parts of xylene, 24.78 parts of p,p'-methylenedianiline and 29.02 parts of fumaric acid was heated and stirred until a solution was formed at 150° C. At 170° C., a xylene-water azeotrope began to distill over and the mixture was heated to 190° C. for an additional hour. This resulted in the separation of the theoretical amount of water of reaction between the dicarboxylic acid and the diamine. The mixture was then allowed to cool to room temperature and a cloudyy heterogeneous mixture was obtained. A cream colored solid was obtained by pouring the mixture into methanol which was dried at 50° C. under reduced pressure for about 5 hours. There was obtained about an 88 percent yield of product. The product softened at 205° C. and flowed at 290° C.

A blend of 30 parts of the above product and 70 parts of glass fibers is milled. There is then added 0.1 part of benzoylperoxide to the resulting mixture. The mixture is then molded at 265° C. under a pressure of 5000 p.s.i. for 15 minutes to produce a test bar. The product is found to be flexible and shows superior shear modulus indicating that it is useful as a laminating and molding compound.

EXAMPLE 4

A mixture of 229 parts of distilled cresol, 25 parts xylene, 24.78 parts of p,p'-methylenedianiline and 32.53 parts of itaconic acid was heated to a temperature of 120° C. resulting in the formation of a solution. A water-xylene azeotrope began to separate at 160° C. Upon continued heating to a temperature of 190° C. for a period of about an hour, there was effected about 100 percent separation of water of reaction of the itaconic acid and the p,p'-methylenedianiline. The solution was then allowed to cool to room temperature and added to an excess of methanol. A white solid precipitated. It was collected and dried at 50° C. under reduced pressure for 5 hours. Based on weight of starting reactants, there was obtained about an 85 percent yield of a polyimide prepolymer having a softening point of about 240–250° C.

A test bar is made from the prepolymer in accordance with the method of Example 1. It is found to be flexible and suitable for making temperature resistant bearings,

EXAMPLE 5

A mixture of 9.8 parts of aniline, 34.7 parts of p,p'-methylenedianiline, 175 parts of cresol and 25 parts of xylene was added to 34.3 parts of maleic anhydride. The resulting mixture was slowly heated to a temperature of 180° C. and refluxed for 1 hour. During the course of heating, a solution of the various ingredients was obtained and water of reaction was separated. After a theoretical amount of water had been collected, the mixture was allowed to cool to room temperature. It was poured into excess methanol to produce a yellow precipitate. After the precipitate was dried under 14 mm./Hg pressure for 16 hours at about 25° C., there was obtained a substantial yield of product based on weight of starting material. The product softened at about 120° C. Based on method of preparation, the product was a polyimide prepolymer resulting from the reaction of p,p'-methylenedianiline, aniline, and maleic anhydride and averaging about 3 or 4 chemically combined reaction product units.

A blend is made of 30 parts of the above prepolymer and 70 parts of 3/16" glass fibers. There is added to the resulting blend, 0.3 part of dicumyl peroxide. The mixture is milled and molded at 165° C. for 10 minutes at 5000 p.s.i. The resulting molded bar has a modulus of about $2 \times 10^6$ p.s.i.

EXAMPLE 6

A mixture was made of 15.12 parts of m-phenylenediamine, 13.7 parts of maleic anhydride, 75 parts of distilled cresol and 75 parts of xylene. The mixture was heated with stirring to produce a solution at 60° C. At 140° C., a xylene-water azeotrope began to distill over. Heating of the mixture was continued to 160° C. resulting in the separation of 100 percent of the theoretical water of reaction of the maleic anhydride and the m-phenylenediamine. The mixture was then allowed to cool to room temperature. A prepolymer was precipitated from the mixture by slowly adding it to excess methanol. A 93 percent yield of a yellow solid was obtained by filtering the mixture. It was dried at 50° C. under reduced pressure for 5 hours. The product had a softening point of 350° C. Based on method of preparation, the product was a prepolymer having an average of about 3 or 4 chemically combined intercondensation units resulting from the reaction of maleic anhydride and m-phenylenediamine.

A film was cast from a 30 percent solids solution of the above prepolymer in N,N-dimethylformamide. The film was cured by heating it to a temperature of between 100° C.–250° C. over a period of about 1 hour. The cured product was flexible indicating that it would be suitable in a variety of coating applications such as a wire enamel.

EXAMPLE 7

A mixture was stirred and heataed consisting of 46.5 parts of hexamethylenediamine, 27.4 parts of maleic anhydride, 150 parts of distilled cresol and 150 parts of xylene. A solution of the aforementioned ingredients was obtained with stirring at a temperature of about 70° C. A xylene-water azeotrope began to separate from the mixture at a temperature of 150° C. Heating was continued and at a temperature of 157° C., over 97 percent of the theoretical water was recovered. The mixture was then allowed to cool to room temperature. A film was cast from the resulting solution onto a glass substrate. It was cured at 100° C. for 1 hour and 200° C. for an additional hour. The film was found to be flexible and it had a cut-through temperature of 395° C. In measuring the cut-through, the film was placed between 50 mil conducting wires under a 1000 gram load in accordance with the method described in Precopio et al. Pat. 2,936,296 assigned to the same assignee as the present invention. The film was suitable as a wire enamel and other insulating applications requiring the services of a high temperature resistant material.

EXAMPLE 8

A mixture of 21.6 parts of m-phenylenediamine, 13.7 parts of maleic anhydride, 75 parts of distilled cresol and 75 parts of xylene was charged to a reaction vessel. The mixture was stirred and heated. At 60° C., a solution of the various ingredients was obtained. Heating of the mixture was continued to 140° C. resulting in the separation of a xylene-water azeotrope. The theoretical amount of water of reaction separated when the mixture was heated with stirring to 160° C. The mixture was then allowed to cool to room temperature. It was poured slowly into methanol to effect precipitation of reaction product. After it had been collected and dried for 5 hours at 50° C. under reduced pressure, there was recovered a 95.8 percent yield of a yellow solid. The product had a softening point of about 256° C.–259° C. Based on method of preparation and its infrared spectrum, the product was a polyimide prepolymer having an average of 3 or 4 chemically combined reaction product units of maleic anhydride and m-phenylenediamine.

EXAMPLE 9

The procedure of Example 9 was repeated, except that there was employed in the reaction mixture 39.2 parts of p,p'-methylenedianiline, 27.4 parts of maleic anhydride, 150 parts of distilled cresol and 150 parts of xylene. A solution of the ingredients was obtained at a temperature of about 60° C. A xylene-water azeotrope started to separate at a temperature of about 140° C. After heating the mixture to 175° C., 100 percent of the theoretical water of reaction of the p,p'-methylenedianiline and maleic anhydride separated. The solution was allowed to cool to room temperature and prepolymer was recovered following the same procedure as previously described. There was obtained a 94 percent yield of a cream colored product having a softening point of between 148–150° C. Based on method of preparation and its infrared spectrum, the product was a prepolymer having greater than 2 chemically combined units resulting from the intercondensation of p,p'-methylenedianiline and maleic anhydride.

EXAMPLE 10

A mixture of 79.2 parts of p,p'-methylenedianiline, 20.6 parts of maleic anhydride, 11.4 parts of Nadic anhydride, 250 parts of cresol and 50 parts of toluene is heated and stirred for 1 hour in accordance with the above-described procedure. A solution of the aforesaid mixture is formed at a temperature of about 60° C. A water-toluene azeotrope begins to separate from the mixture at a temperature of about 115° C. At a temperature of 155° C., the theoretical water of reaction of the organodiamine and unsaturated anhydride is collected. A prepolymer is precipitated by pouring the mixture into excess methanol after it is allowed to cool. There is obtained a quantitative yield of product.

A solution is made by mixing 10 parts of the prepolymer and 10 parts of dimethylformamide. The solution is employed to coat a 2" x 2" glass cloth by immersing the cloth into the solution. The cloth is dried at 120° C. for 8 minutes. After preparing 15 of such treated cloths, they are subjected to a pressure of 200 p.s.i. at room temperature and then slowly heated to 200° C. for 1 hour. There is obtained a void-free laminate which is useful as an electrical circuit board.

EXAMPLE 11

A mixture of 99.14 parts of methylenedianiline, 39.25 parts of maleic anhydride, 315.6 parts of cresol and 100 parts of toluene is heated at 100° C.–150° C. for one hour. During this period, the theoretical water of reaction is separated.

The mixture is cooled to 50° C. and 32.22 parts of benzophenonetetracarboxylic acid dianhydride is added. A clear viscous solution is obtained on cooling. A film is cast from the solution onto an aluminum substrate. The film is heated for 1 hour at a temperature between 100° C.–250° C. There is obtained a cured polyimide film which is found to be flexible and useful as an insulating material.

EXAMPLE 12

A mixture of 9.8 parts of maleic anhydride, 19.8 parts of methylene dianiline, and about 44 parts of cresol was stirred for 1 hour at 25° C. There was obtained a yellow precipitate. There was then added an additional 40 parts of cresol to the mixture, which was heated to 190° C. A clear solution was obtained. Based on method of preparation, the product was a cresol solution of a polyimide prepolymer resulting from the reaction of maleic anhydride and methylene dianiline.

A film was cast from the above solution on an aluminum substrate by pouring the mixture on the substrate and heating it at 300° C. for about ½ hour. The cured film had a cut through of about 360° C.

A copper wire was dipped into the above solution. The teated wire was heated for 3 minutes at 300° C. The treated wire was then dipped into the solution and heated again for 3 minutes at 300° C. There was obtained an insulated copper conductor coated with a polyimide film having a cut through of about 390° C.

EXAMPLE 13

A mixture of 99.15 parts of methylene dianiline, 39.2 parts of maleic anhydride, and 17.82 parts of methyl Nadic anhydride was formed in 250 parts of cresol to produce a solution having about 38% solids at room temperature. The mixture was then heated to 190° C. for 1 hour. The mixture was then allowed to cool to room temperature and a clear solution was obtained. Based on method of preparation, the product was a solution of a low molecular weight reaction product of maleic anhydride, methyl Nadic anhydride, and methylene dianiline.

The above solution was employed to cast a film on an aluminum substrate. The film was heated at 300° C. for about 30 minutes. The film had a cut through of greater than 300° C.

A copper wire was dipped into a 25% cresol solution of the above prepolymer. The dipped wire was then cured for 3 minutes at 300° C. The resulting coated wire was then further treated in the same manner with the prepolymer solution. There was obtained an insulated copper conductor coated with a polyimide film having a cut through of greater than 400° C.

EXAMPLE 14

A mixture of 9.91 parts of methylene dianiline, 4.65 parts of maleic anhydride, and 10.41 parts of Nadic anhydride was stirred in about 44 parts of cresol. The mixture was then heated for 1 hour at 190° C. to produce a clear solution at 25% solids. Based on method of preparation, it was a low molecular weight reaction product of methylene dianiline, maleic anhydride, and Nadic anhydride.

A portion of the above prepolymer solution was poured onto an aluminum substrate. A polymiide film was obtained by heating the treated substrate for 30 minutes at 300° C. The film exhibited a cut through of 340° C.

EXAMPLE 15

A mixture of 24.5 parts of maleic anhydride, 99.13 parts of methylene dianiline, and 41 parts of Nadic anhydride, was stirred at 25° C. in about 250 parts of cresol. The mixture was then heated to 190° C. for 1 hour. There was obtained a clear solution at about 39% solids in cresol of a polyimide prepolymer resulting from the reaction of maleic anhydride, methylene dianiline, and Nadic anhydride.

The above solution was employed to cast a film on aluminum, which was heated ½ hour at 300° C. The cured film exhibited valuable insulating properties.

Although the above examples illustrate only a few of the very many variables which can be employed in the practice of the present invention, it should be understood that the present invention is directed to a method for making a much broader class of polyimide prepolymers and to the products produced thereby utilizing the organic diamines shown by Formula 1 or mixtures of such materials with organic monoamines as previously defined, in combination with aliphatically unsaturated organic anhydrides, dicarboxylic acids, or mixtures thereof, employing the solvents and the conditions defined above.

What we claim as new and desire to secure by Letters Patent of the United States:

1. A method which comprises:
   (1) effecting reaction over a period of up to about 2 hours or less at a temperature in the range of from about 28° C. to 225° C. in the presence of an inert phenolic solvent between (A) from 0.5 to 2 moles of organic diamine, and (B) per mole of aliphatically unsaturated dicarbonyl reactant the said inert phenolic solvent is used in said mixture at least 10% by weight, based on the weight of the mixture.
   (2) recovering a polyimide prepolymer from (1) comprising the reaction product of (A) and (B) where (B) is a member selected from the class consisting of:
      (a) a butendioic acid anhydride selected from the class consisting of maleic anhydride, citraconic anhydride, or itaconic anhydride,
      (b) a dicarboxylic acid selected from the class consisting of, fumaric acid, maleic acid, or 5-vinyl-isophthalic acid,
      (c) mixtures of (a) and (b), and
      (d) a mixture of from 0.05 to 1 mole of a phthalic acid anhydride selected from the class consisting of tetrahydrophthalic anhydride, or 3,6 - endomethylene - 1,2,3,6-tetrahydro-cis-phthalic anhydride, and mono methyl substituted 3,6-endomethylene - 1,2,3,6-tetrahydro-cis-phthalic anhydride per mole of (a), (b), or (c).

2. The method of claim 1, where an inert hydrocarbon solvent is added to facilitate the separation of the water of reaction.

3. The method of claim 1, where the phenolic solvent is cresol.

4. The method of claim 1, where reaction is effected at temperatures below 40° C.

5. The method of claim 1, where reaction is effected at temperatures between 120° C.–195° C.

6. The method of claim 1, where the organic diamine and the aliphatically unsaturated dicarbonyl reactant are employed at substantially equal molar amounts.

7. The method of claim 1, where the organic diamine is 4,4'-diaminodiphenylmethane.

8. The method of claim 1, where the aliphatically unsaturated dicarbonyl reactant is maleic anhydride.

9. The method of claim 1, where the aliphatically unsaturated dicarbonyl reactant is fumaric acid.

10. The method of claim 1, where the aliphatically unsaturated dicarbonyl reactant is a mixture of maleic anhydride and tetrahydrophthalic anhydride.

11. The method of claim 1, where the aliphatically unsaturated dicarbonyl reactant is a mixture of maleic anhydride and 3,6 - endomethylene - 1,2,3,6-tetrahydro-cis-phthalic anhydride.

12. The method of claim 1, where the dicarbonyl reactant is a mixture of maleic anhydride and methyl substituted 3,6 - dimethylendomethylene-1,2,3,6-tetrahydro-cis-phthalic anhydride.

13. The method of claim 1, where the aliphatically unsaturated dicarbonyl reactant is itaconic acid.

14. The method of claim 1, where the organic diamine is m-phenylene diamine.

15. The method of claim 1, where the organic diamine is hexamethylene diamine.

16. The polyimide prepolymer reaction product of a mixture of substantially equal molar amounts of maleic anhydride and p,p'-methylene dianiline in a cresol solvent, produced by the process set forth in claim 1.

17. The polyimide prepolymer reaction product of a mixture of substantially equal molar amounts of fumaric acid and p,p'-methylene dianiline in a cresol solvent, produced by the process set forth in claim 1.

18. The polyimide prepolymer reaction product of a mixture of substantially equal molar amounts of p,p'- methylene dianiline and itaconic acid in a cresol solvent, produced by the process set forth in claim 1.

19. The polyimide prepolymer reaction product of a mixture of aniline, p,p'-methylene dianiline, and maleic anhydride in the presence of a cresol solvent, produced by the process set forth in claim 1.

20. The polyimide prepolymer reaction product of m-phenylene diamine, and maleic anhydride in a cresol solvent, produced by the process set forth in claim 1.

21. The polyimide prepolymer reaction product of hexamethylene diamine in maleic anhydride in a cresol solvent, produced by the process set forth in claim 1.

22. The polyimide prepolymer reaction product of p,p'-methylene dianiline in a mixture of maleic anhydride and endomethylenetetrahydrophthalic anhydride in a cresol solvent, produced by the process set forth in claim 1.

23. The polyimide prepolymer reaction product of methylene dianiline and a mixture of maleic anhydride and methyl endomethylenetetrahydrophthalic anhydride in a cresol solvent, produced by the process set forth in claim 1.

References Cited

UNITED STATES PATENTS

| Patent No. | Date | Inventor | Classification |
|---|---|---|---|
| 2,174,619 | 10/1939 | Carothers | 260—78 UA |
| 2,306,918 | 12/1942 | Weiss et al. | 260—78 UA |
| 3,380,964 | 4/1968 | Grundschober et al. | 260—78 UA |
| 3,406,148 | 10/1968 | Sambeth et al. | 260—78 UA |
| 3,533,996 | 10/1970 | Grundschober et al. | |
| 3,471,444 | 10/1969 | Sherer et al. | 260—78 TF |
| 3,575,924 | 4/1971 | Bargain | 260—78 TF |
| 3,576,691 | 4/1971 | Meyers | 260—32.6 N |
| 2,818,405 | 12/1957 | Kovacic | 260—78 UA |
| 3,652,511 | 3/1972 | Vincent et al. | 260—79 UA |

HAROLD D. ANDERSON, Primary Examiner

U.S. Cl. X.R.

117—128.4, 161 P, 161 UN; 204—159.22; 260—29.2 N, 29.2 UA, 29.6 HN, 29.6 NR, 30.2, 33.4 R, 41 R, 47 CZ, 47 UA, 65, 78 TF, 875, 896, 897, 899